US010757111B1

(12) United States Patent
Marek et al.

(10) Patent No.: US 10,757,111 B1
(45) Date of Patent: Aug. 25, 2020

(54) INFORMATION FLOW ENFORCEMENT FOR MULTILEVEL SECURE SYSTEMS

(71) Applicant: Rockwell Collins, Inc., Cedar Rapids, IA (US)

(72) Inventors: James A. Marek, Anamosa, IA (US); Jonathon C. Skarphol, Robins, IA (US); Adam W. Pfab, Cedar Rapids, IA (US); Edward C. Tubbs, Cedar Rapids, IA (US); John G. Bendickson, Vinton, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 194 days.

(21) Appl. No.: 15/648,323

(22) Filed: Jul. 12, 2017

Related U.S. Application Data

(60) Provisional application No. 62/385,070, filed on Sep. 8, 2016.

(51) Int. Cl.
*H04L 29/06* (2006.01)

(52) U.S. Cl.
CPC ........ *H04L 63/105* (2013.01); *H04L 63/1416* (2013.01); *H04L 63/1433* (2013.01); *H04L 63/0428* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,640,456 | A * | 6/1997 | Adams, Jr. | H04L 29/06 713/153 |
| 7,606,254 | B1 * | 10/2009 | Hardin | G06F 21/85 370/386 |
| 7,643,495 | B2 * | 1/2010 | Metsker | H04L 49/90 370/398 |
| 8,161,529 | B1 * | 4/2012 | Bortz | G06F 21/6218 709/223 |
| 8,166,554 | B2 * | 4/2012 | John | H04L 63/105 726/26 |
| 9,660,966 | B1 * | 5/2017 | Marek | H04L 63/0428 |
| 2002/0136211 | A1 * | 9/2002 | Battle | H04L 47/6205 370/389 |
| 2002/0159389 | A1 * | 10/2002 | Foster | H04L 49/357 370/230 |

(Continued)

*Primary Examiner* — Eric W Shepperd
(74) *Attorney, Agent, or Firm* — Suiter Swantz pc llo

(57) ABSTRACT

A multilevel security fabric with address management units communicatively coupled to ports of a communication fabric and nodes of a multilevel security system are disclosed. The communication fabric facilitates communication between the nodes. An address management unit associated with a particular node extracts address maps contained in data requests associated with the particular node and regulates communication of that node any other nodes within the system across the communication fabric based on whether the extracted address maps are within an allowable address access range specified for the particular node. In the event that an extracted address map fails to fall within the allowable address access range, the address management unit may block the communication with the particular node. Accordingly, the address management unit may enforce multilevel communication across the communication fabric with high assurance.

18 Claims, 4 Drawing Sheets

(56) References Cited

U.S. PATENT DOCUMENTS

| | | | |
|---|---|---|---|
| 2002/0181395 A1* | 12/2002 | Foster | H04L 49/357 |
| | | | 370/229 |
| 2003/0005331 A1* | 1/2003 | Williams | H04L 63/0272 |
| | | | 726/15 |
| 2003/0105881 A1* | 6/2003 | Symons | H04L 29/06 |
| | | | 709/249 |
| 2003/0200315 A1* | 10/2003 | Goldenberg | H04L 47/10 |
| | | | 709/225 |
| 2007/0076599 A1* | 4/2007 | Ayyagari | H04L 9/00 |
| | | | 370/229 |
| 2013/0219495 A1* | 8/2013 | Kulaga | H04L 41/0816 |
| | | | 726/22 |
| 2013/0227284 A1* | 8/2013 | Pfeffer | H04L 63/0236 |
| | | | 713/168 |
| 2013/0235870 A1* | 9/2013 | Tripathi | H04L 41/5019 |
| | | | 370/390 |
| 2014/0153435 A1* | 6/2014 | Rolette | H04L 63/0245 |
| | | | 370/252 |
| 2015/0372854 A1* | 12/2015 | Furukawa | G06F 9/45558 |
| | | | 709/223 |
| 2016/0205071 A1* | 7/2016 | Cooper | H04L 12/6418 |
| | | | 726/1 |
| 2016/0285706 A1* | 9/2016 | Rao | H04L 41/12 |

* cited by examiner

INFORMATION FLOW ENFORCEMENT FOR MULTILEVEL SECURE SYSTEMS

CROSS-REFERENCE TO RELATED APPLICATION

The present application claims the benefit under 35 U.S.C. § 119(e) of U.S. Provisional Application Ser. No. 62/385,070, filed Sep. 8, 2016, entitled INFORMATION FLOW ENFORCEMENT FOR MULTILEVEL SECURE SYSTEMS, naming James A. Marek, Jonathon C. Skarphol, Adam W. Pfab, Edward C. Tubbs, and John G. Bendickson as inventors, which is incorporated herein by reference in the entirety.

BACKGROUND

Multilevel security (MLS) refers to the ability of a communication system to handle information with different classifications (e.g., different security levels), permit access by users/applications with different security clearances, and prevent users/applications from obtaining access to information for which they lack authorization. Management of information flow for MLS systems is critical.

Conventional information flow management and mediation techniques for MLS systems generally rely on high assurance custom infrastructures or trusted computing elements (e.g., high assurance separation kernels hosted on evaluated processors) to facilitate all transactions of MLS traffic flows. Trusted computing elements tend to be either low performance or high power, very complex, and high cost, which are especially true when high assurance support is required.

SUMMARY

In one aspect, embodiments of the inventive concepts disclosed herein are directed to a multilevel security fabric. The multilevel security fabric may include a communication fabric with communication ports to facilitate communications between nodes connected to the communication ports. The multilevel security fabric may further include trusted address management units communicatively coupled to both the communication ports of the communication fabric and the nodes. Further, each node may be associated with a particular trusted address management unit. A particular address management unit associated with a particular node may extract address maps contained in data requests associated with the particular node. A particular address management unit associated with a particular node may further regulate communication with the particular node across the communication fabric based on whether the extracted address maps are within an allowable address access range specified for the particular node.

In a further aspect, embodiments of the inventive concepts disclosed herein are directed to a multilevel security system. The multilevel security system may include multiple nodes communicatively coupled to a communication fabric with communication ports to facilitate communications between nodes connected to the communication ports. The multilevel security system may further include a root of trust to define allowable address ranges for the nodes. The multilevel security system may further include trusted address management units communicatively coupled to both the communication ports of the communication fabric and the nodes. Further, each node may be associated with a particular trusted address management unit. A particular address management unit associated with a particular node may extract address maps contained in data requests associated with the particular node. A particular address management unit associated with a particular node may further regulate communication with the particular node across the communication fabric based on whether the extracted address maps are within an allowable address access range specified for the particular node in which the allowable address access range is received from the root of trust.

In a further aspect, embodiments of the inventive concepts disclosed herein are directed to a multilevel security traffic flow management method. The multilevel security traffic flow management method may include extracting, with an address management unit communicatively coupled to a particular communication port of a communication fabric configured to facilitate communications between multiple of nodes, address maps contained in data requests associated with a particular node connected to the particular communication port. The multilevel security traffic flow management method may further include regulating, with the address management unit, communication with the particular node across the communication fabric based on whether the extracted address maps are within an allowable address access range specified for the particular node.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
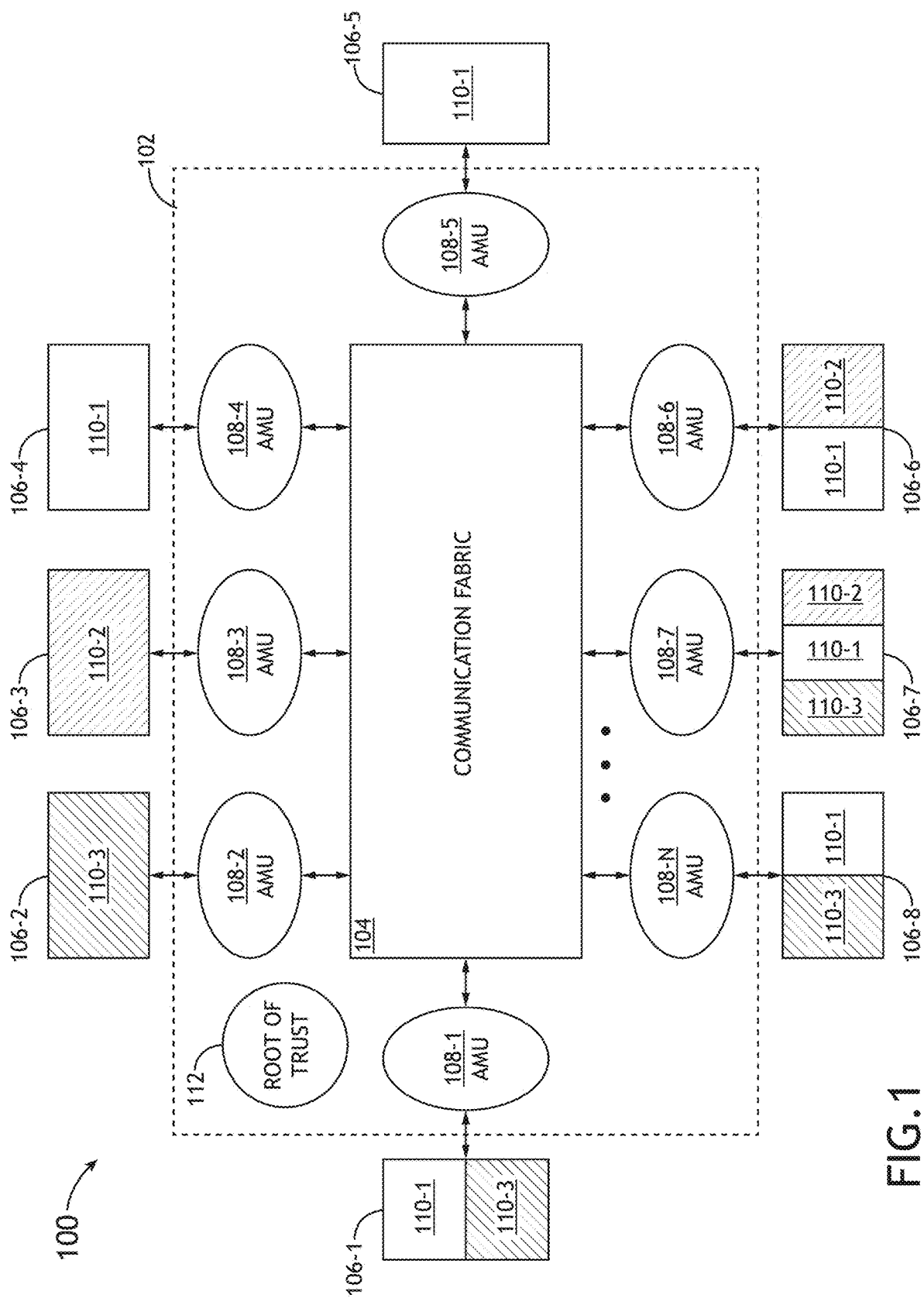
FIG. 1 is a block diagram depicting an exemplary MLS system configured in accordance with an embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Reference will now be made in detail to exemplary embodiments of the inventive concepts disclosed herein, examples of which are illustrated in the accompanying drawings.

Embodiments of the inventive concepts disclosed herein are directed to low cost, high assurance, and high performance communication mechanisms configured to support MLS systems. In some embodiments, a MLS system includes a high performance and low overhead MLS fabric with trusted address management functions to support communications between nodes (e.g. computers). The MLS fabric may include a communications fabric (may also be referred to a bus or communication channel) to provide connectivity between the nodes and may further include trusted address-mapping units (AMUs) to enforce desired information flow policies. In this regard, any communications fabric including, but not limited to, commercial-off-the-shelf (COTS) systems may be utilized within a high-performance, low overhead MLS system without the need for customized infrastructures or trusted computing elements.

Trusted AMUs may be implemented for each particular ingress/egress port of the communications fabric within a MLS system to police transactions based on source and destination address ranges. A particular node connected to a particular port of the MLS fabric may be authorized to communicate along one or more different security levels or classifications according to an information flow policy. The trusted AMUs may enforce the information flow policy based on pre-configured allowable address ranges for read or write transactions through that particular port. The source and destination address ranges monitored and enforced by trusted AMUs may include any type of addresses suitable for a selected communications fabric such as, but not limited to, memory addresses (e.g. as implemented by a Peripheral Component Interconnect Express (PCIe) fabric), Media Access Control (MAC) addresses, Ethernet addresses, Internet Protocol (IP) addresses, or port numbers. The trusted AMUs may further implement additional enforcement flow functions such as, but not limited to encrypting/decrypting data/address information or enforce fair usage of system resources.

Accordingly, inventive concepts disclosed herein may facilitate flexible MLS system design while providing high assurance and high performance. It is contemplated that trusted management functions implemented by the trusted AMUs combined with the communications fabric may constitute a high assurance trusted MLS fabric that can certifiably mediate MLS information flow for high assurance or other categories of traffic requiring information flow mediation, separation, or filtering.

Referring now to FIG. 1, a block diagram depicting an exemplary MLS system 100 configured in accordance with an embodiment of the inventive concepts disclosed herein is shown. The MLS system 100 may utilize a trusted MLS fabric 102 to facilitate communications within the MLS system 100. The trusted MLS fabric 102 may include an underlying communication fabric 104 configured to facilitate communication between various nodes 106 connected using the communication fabric 104 according to an information flow policy defining multiple levels (e.g. domains) of communication. The trusted MLS fabric 102 may further include trusted AMUs 108 associated with each port of the communication fabric 104 to enforce the information flow policy.

A MLS system 100 configured in accordance with inventive concepts disclosed herein may provide communication between any number of nodes 106. The nodes 106 may include any type of computing device. In some embodiments, a node 106 may include one or more processors, one or more transitory or non-transitory memory devices, and/or one or more communications ports. For example, as illustrated in FIG. 1, a MLS system 100 may include N nodes 106 (e.g. a first node 106-1, a second node 106-2, and so forth through an Nth node 106-N). Each node 106 connected to the trusted MLS fabric 102 may be authorized (e.g. according to the information flow policy) for any number of communication levels (e.g. a first communication level 110-1, a second communication level 110-2, or a third communication level 110-3).

The nodes 106 participating in the MLS system 100 may support any number of communication levels. For example, a node (e.g. the second node 106-2) may be configured for a single communication level (e.g. the third communication level 110-3). By way of another example, a node (e.g., the first node 106-1) may be equipped configured to support two or more communication levels (e.g. with an on-chip cryptographic engine) and may be allowed to participate in the MLS system 100 as long as the node is safeguarded by a trusted AMU 108 (e.g., trusted AMU 108-1 in this example) configured in accordance with embodiments of the inventive concepts disclosed herein.

The communication fabric 104 may be any type of address-mapped communication fabric formed from any combination of COTS and custom components or systems. A communication fabric 104 configured in this manner may require the nodes 106 to communicate with each other using address maps. A data consuming node, for example, may be required to send a data request along with an address map to a data producing node. Address maps may include any type of address information associated with the source and/or destination of a communication request such as, but not limited to, a memory address, an Ethernet address, an IP address, a MAC address, or a port number of a node 106. The data producing node may also be required to use an address map when returning the requested data back to the data consuming node. In some embodiments, the communication fabric 104 includes a memory address mapped fabric (e.g. PCIe). In some embodiments, the communication fabric 104 includes a network-based fabric (e.g. an Ethernet or WiFi).

While providing address maps in this manner may facilitate data communication using the communication fabric 104, such address maps may additionally be utilized to help provide trust over the communication fabric 104 by allowing or disallowing communication based on the address maps provided by nodes 106. For example, if it is known that a node 106-4 is only authorized for communication in the first communication level 110-1 (e.g. with other nodes similarly authorized for communication in the first communication level 110-1 such as node 106-5), a mechanism may be provided to extract and analyze address maps associated with every data request originated from (or coming out of) the node 106-4 to determine whether the node 106-4 is attempting to perform an unauthorized data access. Similarly, address maps associated with every data request delivered to (or to be received by) the node 106-4 may also be extracted and analyzed to determine whether any unauthorized nodes are attempting to gain access to the node 106-4. It is noted that by providing such mechanisms to safeguard all nodes 106 in the MLS system 100, system-wide trust can be provided effectively.

By way of another example, data access between nodes 106 may be restricted to certain communication levels based on the address maps. For instance, data on a storage node authorized to communicate in either the first communication level 110-1, the second communication level 110-2, or the third communication level 110-3 (e.g. node 106-7) may be designated with a communication level that dictates a required level of authorization for access. Accordingly, a requesting node authorized to communicate in only the first communication level 110-1 or the second communication level 110-2 (e.g. node 106-6) may only access data on the storage node designated for the first communication level 110-1 or the second communication level 110-2 and may be restricted from accessing data on the third communication level 110-3.

In some embodiments, each I/O port of the communication fabric 104 may be equipped with (e.g., communicatively coupled to) a trusted AMU 108 configured to perform the aforementioned extraction and analysis to enforce the information flow policy of the MLS system 100. It is noted that while specific implementations of the trusted AMUs 108 may vary, the purpose of providing the trusted AMUs 108 is to help safeguard the transactions based on allowable address access ranges for read and/or write transactions to and/or from the nodes 106 to enforce trust over the MLS system 100.

In some embodiments, trusted AMUs 108 may monitor communications between nodes 106 and may further analyze communications between nodes 106 for erroneous and/or malicious activity. For example, referring to the exemplary MLS system 100 depicted in FIG. 1, if a trusted AMU 108-4 determines that the node 106-4 is attempting to read from a memory address outside of an allowable memory access range, the trusted AMU 108-4 may block the unauthorized read request and prevent the unauthorized read request from reaching the communication fabric 104. In this regard, trusted AMUs 108 may provide trust for communication across any type of communication fabric 104. Further, if the trusted AMU 108-4 determines that the node 106-4 is repeatedly (e.g., above a certain threshold) attempting to read from a memory address outside of the allowable memory access range for read transactions from the node 106-4, the trusted AMU 108-4 may deem the node 106-4 malicious and may log, report, and/or provide an alert (e.g., to a system administrator) accordingly. Write requests to and/or from the node 106-4 may be safeguarded in a similar manner.

The information flow policy may be selected prior to startup of MLS system 100. For example, the allowable address access ranges for read and/or write transactions associated with each node 106 may be utilized to program each corresponding trusted AMU 108. This programming process may be carried out in various manners. For instance, in some embodiments, each trusted AMU 108 may be locally/manually programmed (e.g., by a system administrator) based on the selected information flow policy. Alternatively and/or additionally, a trusted node or a root of trust 112 with a trusted communication path to all trusted AMUs 108 may be utilized to program the trusted AMUs 108 at system startup to achieve a secure initial state. It is contemplated that the trusted communication path utilized in this manner may be an in-band channel (e.g., a dedicated and trusted channel provided by the communication fabric 104) or an out-of-band channel (e.g., a trusted communication interface, such as serial peripheral interface, inter-integrated circuit, serial, PCIe, Wi-Fi, or the like, that operates independently with respect to the communication fabric 104) without departing from the broad scope of the inventive concepts disclosed herein. In some embodiments, the root of trust 112 may dynamically modify the information flow policy after system startup (e.g. during runtime) to dynamically reprogram the trusted AMUs 108 while maintaining trust within the MLS system 100.

In some embodiments, the trusted AMUs 108 support encryption and/or other viable forms of confidentiality protection to extending trusted communication through an untrusted external connection or to add additional protection for the internal connections. For example, data requests and/or payload data may be encrypted by a trusted AMU 108 associated with a transmitting node 106 and decrypted by a trusted AMU 108 of a receiving node 106. In this regard, information transmitted across the communication fabric 104 may be encrypted. Further, in the event that the information transmitted across the communication fabric 104 is inadvertently or maliciously received by an unauthorized node 106, such information may be encrypted and unreadable. For instance, encrypting payload data (e.g. data to be send or received by a particular node 106) may prevent access by unauthorized nodes 106. Similarly, encrypting address maps associated with data requests may prevent unauthorized nodes 106 from extracting the intended communication path. By way of another example, encryption may facilitate the definition of and/or distinction between communication levels as generally described in U.S. Pat. No. 9,660,966 entitled "Multilevel Secure Communication Systems with Encryption Based Separation" and issued on May 23, 2017, which is hereby incorporated by reference in its entirety.

It is contemplated that other optional confidentiality protections may include, but are not limited to, integrity checks (e.g., parity, cyclic redundancy check, hash, or signature) of the address and/or payload data to increase integrity through the communication fabric 104, optional retry request for failed integrity checks (e.g., counting failures and support for lockout or throttling based on some number of failures), dynamic programmability of the trusted AMUs 108, and/or optional integrity checks of the configuration of the trusted AMUs 108.

In some embodiments, trusted AMUs 108 may inspect payloads for malicious activity prior allowing or blocking an intended communication. For example, a trusted AMU 108 may extract payload data from a data request corresponding to a connected node 106 and may further perform any number of security checks (e.g. virus scans or malware scans) on the payload data itself. The trusted AMU 108 may then allow the communication over the communication fabric 104 only if the payload data is deemed to be safe. In this regard, the trusted AMUs 108 may provide additional protection for the MLS system 100.

The trusted AMUs 108 may be, but are not required to be, configured to enforce fair usage (e.g., time slotting) of the resources provided by the MLS system 100. In some embodiments, the trusted AMUs 108 are configured to prohibit flooding of the bandwidth by one or more nodes 106 participating in the MLS system 100. The trusted AMUs 108 may also be configured to allocate specific bandwidth limitations to prevent misuse of resources or to facilitate a desired level of system performance. For example, the trusted AMUs 108 may allocate selected bandwidth limitations for one or more nodes 106. By way of another example, the trusted AMUs 108 may allocate selected bandwidth limitations based on the communication level. In this regard, communication within the MLS system 100 may be prioritized based on the communication level. The trusted AMUs 108 may be further configured to enforce information flow mediation for either safety or security (or any sort of information flow mediation where high performance and low cost implementations are desirable).

It is to be understood that the trusted AMUs 108 may be implemented in various manners without departing from the broad scope of the inventive concepts disclosed herein. For instance, the trusted AMUs 108 may be implemented as logic hosted inside of programmable logic devices, dedicated processing units, application-specific integrated circuits (ASICs), field-programmable gate arrays (FPGAs), commercial off-the-shelf (COTS) chips, or various other types of processing boxes, boards, cards, chips, cores and the like.

Further, the trusted AMUs 108 may be implemented within a centralized trusted MLS fabric 102 or a decentralized trusted MLS fabric 102.

Figure 2:
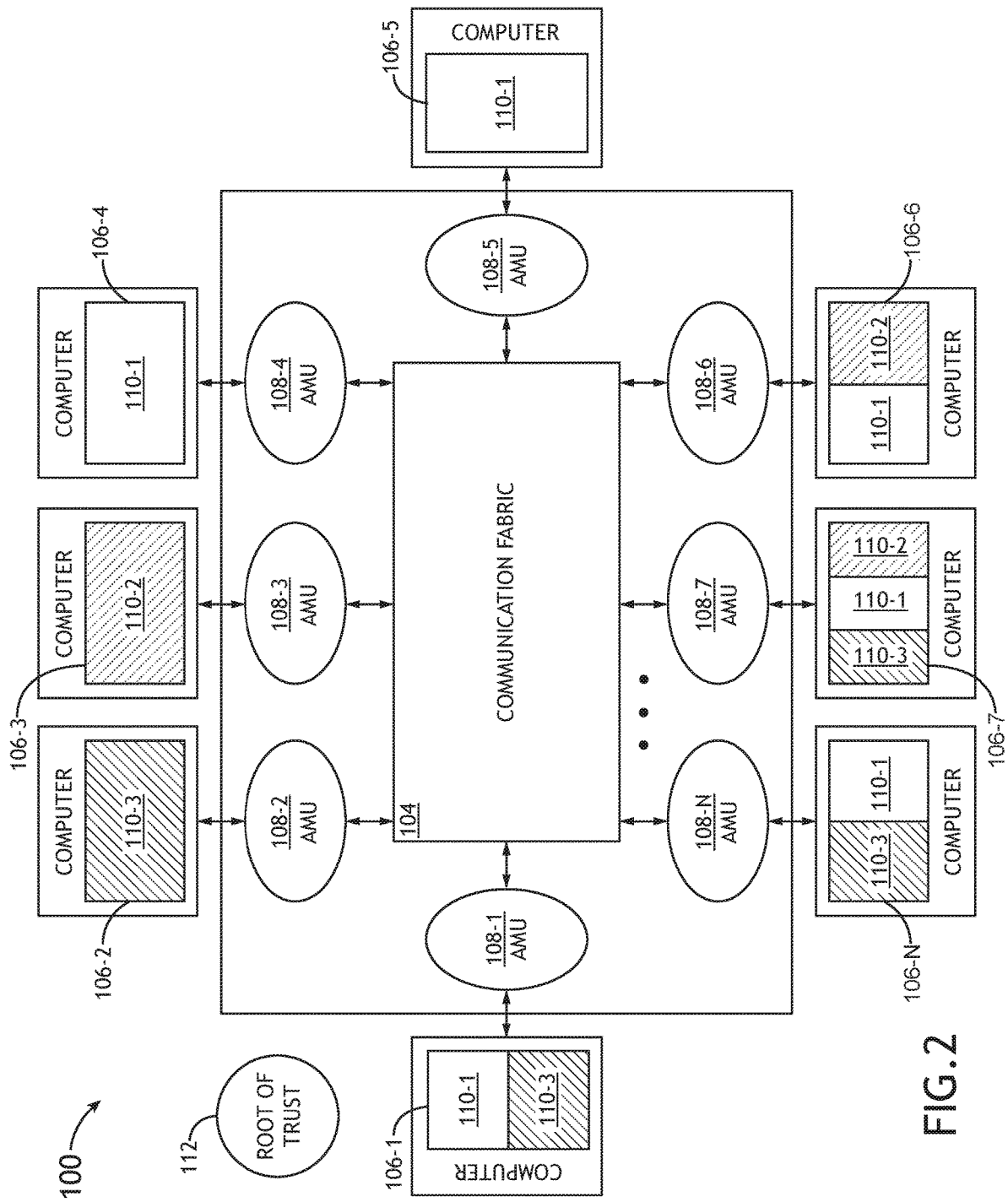
FIG. 2 is a block diagram depicting an exemplary MLS system with a centralized trusted MLS fabric configured in accordance with an embodiment of the inventive concepts disclosed herein.

Referring now to FIG. 2, a block diagram depicting an exemplary MLS system 100 with a centralized trusted MLS fabric 102 configured in accordance with an embodiment of the inventive concepts disclosed herein is shown. In some embodiments, the trusted AMUs 108 may be integrated (e.g. with hardware and/or software) with the communication fabric 104 to form an integrated package or platform. For example, the trusted AMUs 108 may be inserted (e.g., as bump-in-the-wire) into the communication fabric 104. In this regard, any type of processing device (e.g. a computer) may participate in the MLS system 100 as a node 106 by connecting to a port of the integrated trusted MLS fabric 102. Further, a trusted AMU 108 may be associated with each port to enforce the information flow policy between any connected nodes 106 across the communication fabric 104.

Figure 3:
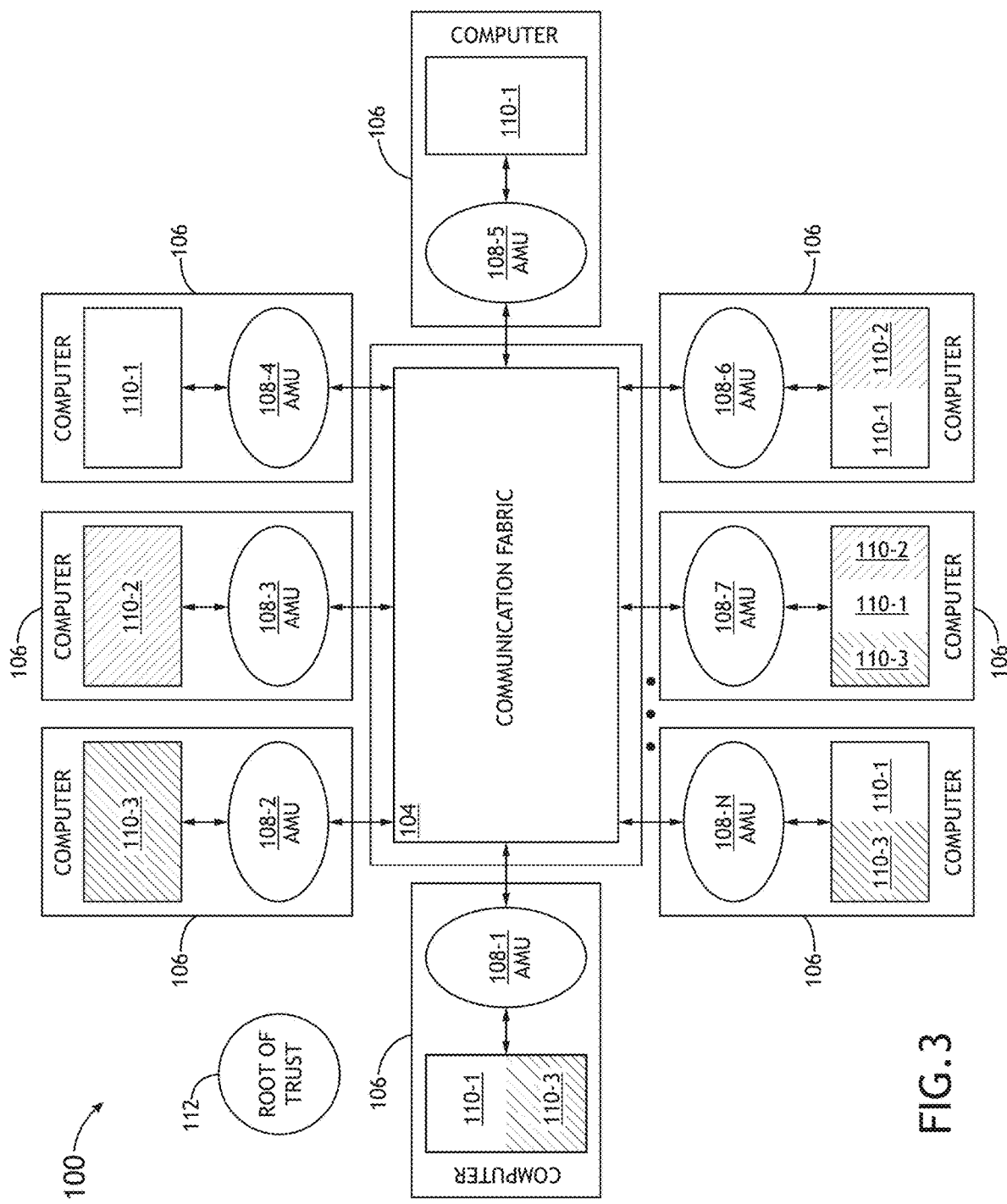
FIG. 3 is a block diagram depicting an exemplary MLS system with a decentralized trusted MLS fabric configured in accordance with an embodiment of the inventive concepts disclosed herein.

Referring now to FIG. 3, a block diagram depicting an exemplary MLS system 100 with a decentralized trusted MLS fabric 102 configured in accordance with an embodiment of the inventive concepts disclosed herein is shown. In some embodiments, one or more trusted AMUs 108 are distributed to the nodes 106 participating in the MLS system 100. The trusted AMUs 108 distributed in this manner may be hosted in trusted kernels of their corresponding nodes 106, effectively forming the MLS system 100 depicted in FIG. 1 without requiring the trusted AMUs 108 to be physically provided in the communication fabric 104. Additionally, it is contemplated that a MLS system 100 may include a hybrid trusted MLS fabric 102. For example, the MLS system 100 may include a hybrid of bump-in-the-wire trusted AMUs 108 and distributed trusted AMUs 108 without departing from the broad scope of the inventive concepts disclosed herein.

It is to be understood that while a one-to-one correspondence is shown between the trusted AMUs 108 and the nodes 106 depicted in FIGS. 1-3, such a correspondence is merely exemplary and is not meant to be limiting. It is contemplated that a trusted AMU 108 may be configured to support more than one node 106 without departing from the broad scope of the inventive concepts disclosed herein.

As will be appreciated from the above, an MLS system configured in accordance with embodiments of the inventive concepts disclosed herein utilizes a low complexity and low cost approach to provide a high efficiency trusted computing environment. It is noted that MLS systems configured in accordance with embodiments of the inventive concepts disclosed herein may be applicable to computing, networking, software defined radio, as well as various other types of applications. In some embodiments, the MLS systems configured in accordance with embodiments of the inventive concepts disclosed herein may be utilized in ground-based vehicles, maritime vehicles, airborne vehicles, or space vehicles.

It is also noted that while the solution disclosed herein does not itself implement cross domain transfer functionalities (e.g., allowing a node of one security level to communicate with another node of another security level), cross domain transfer functionalities may be provided and/or integrated with the solution disclosed herein to provide additional benefit for MLS systems. For instance, it is contemplated that the trusted AMUs may be coupled with a high performance cross domain filter engine. For example, high assurance guards for regulating data flow between communication levels are generally described in U.S. Pat. No. 7,606,254 entitled "Evaluatable High-Assurance Guard For Security Applications" and issued on Oct. 20, 2009 and in U.S. Pat. No. 8,161,529 entitled "High-Assurance Architecture For Routing of Information Between Networks of Differing Security Level" and issued on Apr. 17, 2012, both of which are incorporated herein by reference in their entirety.

Figure 4:
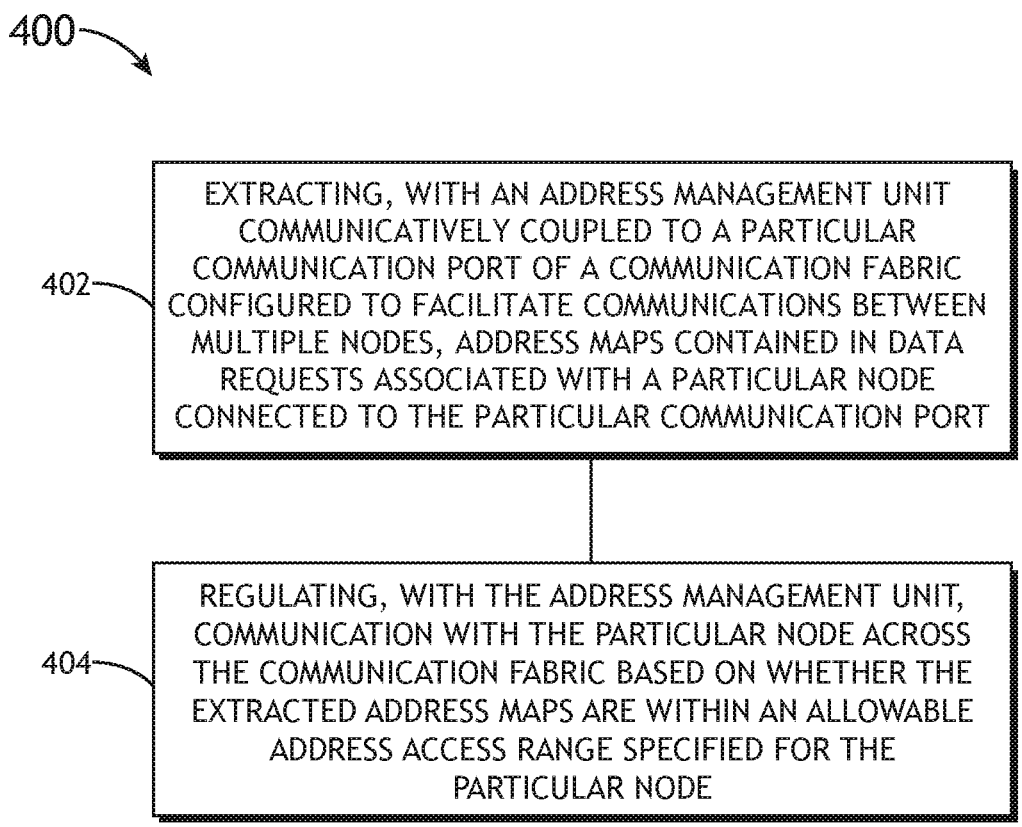
FIG. 4 is a flow diagram depicting an exemplary method for managing MLS traffic in an MLS system configured in accordance with embodiments of the inventive concepts disclosed herein.

Referring now to FIG. 4, a flow diagram depicting an exemplary method 400 for managing MLS traffic in an MLS system configured in accordance with embodiments of the inventive concepts disclosed herein is shown. The embodiments and enabling technologies described previously herein in the context of the MLS system 100 should be interpreted to extend to method 400. However, the method 400 is not limited to the architecture of the MLS system 100.

A step 402 of method 400 may be include extracting, with an AMU communicatively coupled to a particular communication port of a communication fabric configured to facilitate communications between nodes, address maps contained in data requests associated with a particular node connected to the particular communication port. The communication fabric may include any type of address-mapped fabric requiring a transmitting node to provide an address of a receiving node to initiate communication (e.g. transfer of payload data). Further, the communication fabric may include any desired components such as COTS components typically not used to provide trusted communications with high assurance. For example, a PCIe communication fabric may utilize memory address maps to facilitate communications between connected nodes. Accordingly, step 402 may include extraction of this address map information associated with communication of a particular node by an address management unit communicatively coupled to a port of the communication fabric as well as the particular node.

A step 404 may include regulating, with the AMU, communication with the particular node across the communication fabric based on whether the extracted address maps are within an allowable address access range specified for the particular node. For example, the address management unit may allow or block communication to or from the particular node based on whether the extracted address map information is within an allowable address access range specified for the particular node. The AMU may thus facilitate trusted communication with high assurance across any type of communication fabric.

Further, an address management unit and a coupled communication fabric configured in accordance with inventive concepts disclosed herein may provide a trusted MLS communication fabric for high assurance communication within an MLS system. In some embodiments, AMUs connected to both nodes of a MLS system and the communication fabric execute a desired information flow policy to provide secure, high-assurance multi-level communication between nodes in the system. For example, different nodes on the MLS system may be authorized to communicate with any of several communication levels. In this regard, only nodes with the same level of authorization may communicate and share data. According to inventive concepts disclosed herein, the AMUs may police communication between two or more nodes within the system based on whether address maps associated with an intended communication are within allowable ranges for the two or more nodes (e.g. associated with authorized communication levels for each of the two or more nodes). In the event that the address maps are not within allowable ranges for any of the two or more nodes (e.g. through an error or through malicious activity), the AMUs may block the intended communication before data is sent across the communication fabric. If data requests originated from or delivered to a particular node repeatedly fall outside of the allowable memory access range specified for that particular node, additional steps (e.g., logging, reporting, and/or alert steps) may be invoked.

In some embodiments, an AMU may provide additional security measures to facilitate high assurance communication. For example, the AMUs may encrypt/decrypt information (e.g. address maps or payload data) such that errant communication across the communication fabric may not be accessed by unauthorized nodes. By way of another example, the AMUs may regulate communication by enforcing usage or bandwidth policies to manage system resource. For instance, AMUs may implement time-slotting of data requests and data transmission across the communication fabric to prohibit flooding of an available communications bandwidth by one or more nodes or provide a desired level of system performance.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A multilevel security fabric, comprising:
   a communication fabric comprising a plurality of communication ports, the communication fabric configured to facilitate communication between a plurality of nodes, wherein data on each of the plurality of nodes is mapped to unique addresses accessible through the communication fabric, wherein an information flow policy assigns each address associated with data on each of the plurality of nodes at least one of two or more communication levels; and
   a plurality of trusted address management units disposed between the plurality of communication ports of the communication fabric and the plurality of nodes, wherein the plurality of trusted address management units regulate data transfer between nodes of the plurality of nodes based on the information flow policy, wherein a particular trusted address management unit of the plurality of trusted address management units that is communicatively coupled to a particular communication port of the communication fabric and a particular node of the plurality of nodes is configured to:
   extract an address map contained in a communication request from the particular node to access data on an additional node of the plurality of nodes, the address map comprising at least a particular communication level of the two or more communication levels and an address of the data on the additional node associated with the communication request; and regulate communication with the particular node across the communication fabric based on whether the particular node is authorized to communicate in the particular communication level and whether the data on the additional node associated with the communication request is associated with the particular communication level.

2. The multilevel security fabric of claim 1, wherein an address in the address map comprises:
at least one of a memory address, an Ethernet address, an internet protocol address, a media access control address, or a port number.

3. The multilevel security fabric of claim 1, wherein the communication request associated with the connected node comprises:
a request to at least one of read or write data associated with the address map.

4. The multilevel security fabric of claim 1, wherein regulating communication with the connected node across the communication fabric comprises:
blocking communication if the particular node is not authorized to communicate in the particular communication level or if the data on the additional node associated with the communication request is not associated with the particular communication level.

5. The multilevel security fabric of claim 1, wherein the particular trusted address management unit is further configured to:
encrypt at least one of the extracted address map or data transmitted by the particular node prior to transmission across the communication fabric, wherein an additional trusted address management unit coupled to the additional node is configured to decrypt at least one of the extracted address map or the data transmitted by the particular node.

6. The multilevel security fabric of claim 1, wherein the particular trusted address management unit is further configured to:
extract payload data contained in the communication request associated with the particular node;
inspect the payload data for malicious activity; and
regulate communication with the particular node across the communication fabric based on the inspection.

7. The multilevel security fabric of claim 1, wherein the communication fabric comprises:
at least one of a peripheral component interconnect express fabric, an Ethernet fabric, or a wireless communication fabric.

8. The multilevel security fabric of claim 1, wherein at least one of the plurality of trusted address management units are inserted into the communication fabric in a bump in the wire configuration.

9. The multilevel security fabric of claim 1, further comprising:
a root of trust configured to define the information flow policy.

10. The multilevel security fabric of claim 1, wherein data stored on the particular node is mapped to unique addresses accessible through the communication fabric, wherein the information flow policy assigns each address associated with the data on the particular node at least one of the two or more communication levels, wherein the particular trusted address management unit is further configured to:
extract an address map contained in an incoming communication request from the additional node to access data on the particular node, the address map containing at least a particular communication level of the two or more communication levels and an address of the data on the particular node associated with the incoming communication request; and
regulate communication with the particular node across the communication fabric based on whether the additional node is authorized to communicate in the particular communication level of the incoming communication request and whether the data on the particular node associated with the incoming communication request is associated with the particular communication level of the incoming communication request.

11. The multilevel security fabric of claim 1, wherein the communication fabric is a memory address mapped communication fabric, wherein the addresses associated with the data on each of the plurality of nodes comprise memory addresses.

12. A multilevel security system, comprising:
a plurality of nodes;
a communication fabric comprising a plurality of communication ports, the communication fabric configured to facilitate communications between at least some of the plurality of nodes, wherein data on each of the plurality of nodes is mapped to unique addresses accessible through the communication fabric;
a root of trust configured to define an information flow policy, wherein the information flow policy assigns each address associated with data on each of the plurality of nodes at least one of two or more communication levels; and
a plurality of trusted address management units disposed between the plurality of communication ports of the communication fabric and the plurality of nodes, wherein the plurality of trusted address management units regulate data transfer between nodes of the plurality of nodes based on the information flow policy, wherein a particular trusted address management unit of the plurality of trusted address management units that is communicatively coupled to a particular communication port of the communication fabric and a particular node of the plurality of nodes is configured to:
extract an address map contained in a communication request from the particular node to access data on an additional node of the plurality of nodes, the address map comprising at least a particular communication level of the two or more communication levels and address of the data on the additional node associated with the communication request; and
regulate communication with the particular node across the communication fabric based on whether the particular node is authorized to communicate in the particular communication level and whether the data on the additional node associated with the communication request is associated with the particular communication level.

13. The multilevel security system of claim 12, wherein the root of trust defines the information flow policy during at least one of startup or dynamically during runtime.

14. The multilevel security system of claim 12, wherein the root of trust comprises:
a node of the plurality of nodes.

15. The multilevel security system of claim 12, wherein an address in the address map comprises:
at least one of a memory address, an Ethernet address, an internet protocol address, a media access control address, or a port number.

16. The multilevel security system of claim 12, wherein data stored on the particular node is mapped to unique addresses accessible through the communication fabric, wherein the information flow policy assigns each address associated with the data on the particular node at least one of the two or more communication levels, wherein the particular trusted address management unit is further configured to:

extract an address map contained in an incoming communication request from the additional node to access data on the particular node, the address map containing at least a particular communication level of the two or more communication levels and an address of the data on the particular node associated with the incominq communication request; and regulate communication with the particular node across the communication fabric based on whether the additional node is authorized to communicate in the particular communication level of the incominq communication request and whether the data on the particular node associated with the incominq communication request is associated with the particular communication level of the incominq communication request.

17. The multilevel security fabric of claim 12, wherein the communication fabric is a memory address mapped communication fabric, wherein the addresses associated with the data on each of the plurality of nodes comprise memory addresses.

18. A multilevel security traffic flow management method, comprising:

extracting, with a trusted address management unit, an address map associated with a communication request between a first node and a second node across a communications fabric including a plurality of communication ports, wherein the trusted address management unit is disposed between the first node and a first communication port of the plurality of communication ports, wherein data on the second node is mapped to unique addresses accessible through the communication fabric, wherein an information flow policy assigns each address associated with data on the second node at least one of two or more communication levels, wherein the trusted address management unit is configured to regulate communication by the first node based on the information flow policy, wherein the address map comprises at least a particular communication level of the two or more communication levels and an address of the data on the second node associated with the communication request; and regulating, with the trusted address management unit, communication with the particular node across the communication fabric based on whether the particular node is authorized to communicate in the particular communication level and whether the data on the additional node associated with the communication request is associated with the particular communication level.

\* \* \* \* \*